United States Patent
Lim

(10) Patent No.: US 9,619,895 B2
(45) Date of Patent: Apr. 11, 2017

(54) IMAGE PROCESSING METHOD OF VEHICLE CAMERA AND IMAGE PROCESSING APPARATUS USING THE SAME

(71) Applicant: MANDO CORPORATION, Pyeongtaek-si (KR)

(72) Inventor: Jun Taek Lim, Seongnam-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 386 days.

(21) Appl. No.: 14/465,814

(22) Filed: Aug. 21, 2014

(65) Prior Publication Data

US 2015/0054955 A1    Feb. 26, 2015

(30) Foreign Application Priority Data

Aug. 22, 2013 (KR) .................. 10-2013-0099371

(51) Int. Cl.
*G06T 7/20* (2017.01)
*B60R 1/00* (2006.01)
(Continued)

(52) U.S. Cl.
CPC ............. *G06T 7/204* (2013.01); *B60R 1/00* (2013.01); *G06K 9/00798* (2013.01); *G06K 9/00825* (2013.01); *G06T 5/002* (2013.01); *G06T 5/50* (2013.01); *G06T 7/254* (2017.01); *G06T 2207/10004* (2013.01); *G06T 2207/10016* (2013.01); *G06T 2207/20076* (2013.01); *G06T 2207/20081* (2013.01); *G06T 2207/30252* (2013.01); *G06T 2207/30256* (2013.01)

(58) Field of Classification Search
None
See application file for complete search history.

(56) References Cited

U.S. PATENT DOCUMENTS

| 9,330,446 B2 * | 5/2016 | Park .................... G06T 5/50 |
| 2006/0187308 A1 * | 8/2006 | Lim .................... G06T 5/50 348/208.4 |

(Continued)

FOREIGN PATENT DOCUMENTS

KR    10-2013-0015974    2/2013

*Primary Examiner* — Sath V Perungavoor
*Assistant Examiner* — Janese Duley
(74) *Attorney, Agent, or Firm* — Ladas & Parry, LLP

(57) ABSTRACT

Disclosed herein is an image processing apparatus of a vehicle camera, including a light source extraction unit configured to extract light sources from a first frame exposed to light sources during a first time and to extract light sources including motion blurs from a second frame exposed to the light sources during a second time longer than the first time, a target light source classification unit configured to classify a first target light source that belongs to the light sources of the first frame and that does not move and a second target light source that belongs to the light sources of the second frame and that does not move, and a motion determination unit configured to estimate a first location that is the central point of the first target light source and a second location that is the central line including the central point of the second target light source, compare the first location with the second location, and determine whether or not a pitch motion of the vehicle has occurred.

11 Claims, 7 Drawing Sheets

(51) Int. Cl.
*G06K 9/00* (2006.01)
*G06T 5/00* (2006.01)
*G06T 5/50* (2006.01)
*G06T 7/254* (2017.01)

(56) References Cited

U.S. PATENT DOCUMENTS

| | | | |
|---|---|---|---|
| 2007/0221822 A1* | 9/2007 | Stein | B60Q 1/143 |
| | | | 250/205 |
| 2012/0127345 A1* | 5/2012 | Matsunaga | H04N 5/2354 |
| | | | 348/231.99 |
| 2013/0022236 A1* | 1/2013 | Chang | G06T 7/0048 |
| | | | 382/103 |
| 2014/0132784 A1* | 5/2014 | Chouly | G06T 5/003 |
| | | | 348/208.1 |
| 2015/0172626 A1* | 6/2015 | Martini | G06T 7/0065 |
| | | | 348/50 |

* cited by examiner

First frame　　　　　　　　Second frame

First frame　　　　　　　　Second frame

IMAGE PROCESSING METHOD OF VEHICLE CAMERA AND IMAGE PROCESSING APPARATUS USING THE SAME

CROSS-REFERENCE TO RELATED APPLICATION

This application claims the benefit of Korean Patent Application No. 10-2013-0099371 filed on Aug. 22, 2013, with the Korean Intellectual Property Office, the disclosure of which is incorporated in its entirety herein by reference.

BACKGROUND OF THE INVENTION

Field of the Invention

Exemplary embodiments of the present invention relate to an image processing method of a vehicle camera and an image processing apparatus using the same, and more particularly, to an image processing method of a vehicle camera and an image processing apparatus using the same, which are capable of improving the stability and reliability of a vehicle driving assist system that uses a night image captured by a camera mounted on a vehicle by effectively correcting the night image.

Description of the Related Art

Recently, a detection device for detecting objects, such as traffic lanes, signs, vehicles, or other geographic features, using an optical device, such as a camera mounted on a vehicle, is actively developed. Information about an object detected by such a detection device may be used for safety driving of a vehicle. However, while a vehicle is driven, a pitch motion may be generated depending on the state of a road surface on a road. The pitch motion denotes the up-down movement of a vehicle attributable to moving road conditions.

Such a pitch motion in the vehicle may become a cause of generating an error when the detection device detects the object. Accordingly, there is a need for a technology capable of minimizing an error in the pitch motion.

In the case of an image stabilization method, such as an existing pitch motion solution, edge components near the horizon that appear in an image are extracted, a difference between an image of a previous frame and an image of a current frame is measured, and a current pitch motion of a vehicle is estimated based on a result of the difference. An example related to such pitch motion estimation is disclosed in Korean Patent Application Publication No. 2013-0015974 (Feb. 14, 2013).

However, there is a case where the horizon is unable to be monitored using a camera because intensity of illumination is insufficient at night. In such a case, performance may be deteriorated if the existing method is used.

In relation to a streetlamp appearing at the upper end of an image at night, the most important thing is to analyze a motion within then image of the streetlamp when the motion characteristic of the streetlamp are searched for using data, such as a motion within an image, vehicle speed, and a yaw rate. In this case, the motion within then image of the streetlamp is chiefly analyzed using a tracking algorithm.

If many light sources are present in front of the vehicle in various forms, however, a computational load required to perform the tracking algorithm is very great. As a result, there is a problem in that performance is deteriorated.

PRIOR ART DOCUMENT

Patent Document (Patent Document 001) Korean Patent Application Publication No. 2013-0015974 (Feb. 14, 2013)

SUMMARY OF THE INVENTION

Accordingly, the present invention has been made keeping in mind the above problems occurring in the conventional art, and an object of the present invention is to provide an image processing method of a vehicle camera and an image processing apparatus using the same, which are capable of preventing a reduction in the recognition of a traffic lane or the reliability of distance accuracy that is attributable to the vibration of a vehicle when a driving assist system mounted on the vehicle determines the distance from a preceding vehicle based on a night image captured by a camera mounted on the front part of the vehicle.

In accordance with a first aspect of the present invention for achieving the object of the present invention, an image processing apparatus of a vehicle camera may include a light source extraction unit configured to extract light sources from a first frame exposed to light sources during a first time and to extract light sources generating motion blurs from a second frame exposed to the light sources during a second time longer than the first time; a target light source classification unit configured to classify a first target light source that belongs to the light sources of the first frame and that does not move and a second target light source that belongs to the light sources of the second frame and that does not move; and a motion determination unit configured to estimate a first location that is the central point of the first target light source and a second location that is the central line including the central point of the second target light source, compare the first location with the second location, and determine whether or not a pitch motion of the vehicle has occurred.

Furthermore, the image processing apparatus may further include a correction unit configured to correct an image of the vehicle camera based on a result of the comparison between the first location and the second location.

Furthermore, the light source that does not move may include at least one of a streetlamp and a visual guidance reflector.

Furthermore, the motion determination unit may be further configured to overlap the first frame and the second frame and to determine the direction or degree of the pitch motion of the vehicle based on the location where the first location and the second location are overlapped.

Furthermore, the digital sensor of the image processing apparatus may be a rolling shutter type CMOS sensor.

In accordance with a second aspect of the present invention for achieving the object of the present invention, an image processing method of a vehicle camera may include extracting light sources from a first frame that has been obtained by the vehicle camera and that has been exposed to light sources during a first time; classifying a first target light source that belongs to the extracted light sources and that does not move; computing a first location that is the central point of the first target light source; extracting light sources generating motion blurs from a second frame that has been obtained by the vehicle camera and that has been exposed to light sources during a second time longer than the first time; classifying a second target light source that belongs to the light sources extracted from the second frame and that does not move; computing a second location that is the central line including the central line of the second target light source; comparing the first location with the second location; and determining whether or not a pitch motion of the vehicle has occurred based on a result of the comparison between the first location and the second location.

The image processing method may further include correcting an image of the vehicle camera based on the result of the comparison between the first location and the second location.

Furthermore, classifying the first target light source or classifying the second target light source may include classifying a light source present in a predetermined region of the first frame or the second frame as a target light source.

Furthermore, classifying the first target light source or classifying the second target light source may include classifying a plurality of streetlamps or visual guidance reflectors arranged along a road as target light sources in accordance with a training method using a support vector machine.

Furthermore, computing the first location or computing the second location may include performing binarization on an image of the first frame or the second frame and extracting coordinates of the center of gravity of pixels having a specific value as the first location or the second location.

Furthermore, determining whether or not the pitch motion of the vehicle has occurred based on the result of the comparison between the first location and the second location may include overlapping the first frame and the second frame and determining the direction or degree of a pitch motion generated by the vehicle based on a position where the first location and the second location are overlapped.

Furthermore, the second frame may be a frame that belongs to a plurality of frames included in the image and that is placed right after the first frame.

Furthermore, correcting an image of the vehicle camera may include extracting an optimized correction direction and distance using a RANdom SAmple Consensus (RANSAC) algorithm and correcting the image.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Implementation examples and embodiments of the present invention are described in detail hereinafter so that those skilled in the art to which this application pertains may readily practice the present invention.

However, this application may be implemented in various other forms and is not limited to the implementation examples and embodiments described herein.

In the entire specification, unless explicitly described to the contrary, the word "comprise or include" and variations, such as "comprises or includes" or "comprising or including", will be understood to imply the inclusion of stated elements but not the exclusion of any other elements.

In the entire specification of this application, when it is said that one step is placed anterior or posterior to the other step, it will be understood to include a case where a third step is present between the two steps in addition to a case where one step is directly associated with the other step.

In the entire specification of this application, a term of a degree, such as "about" or "substantially", is used in a corresponding numerical value or used as a meaning close to the numerical value when unique manufacturing and an allowable error are presented in a described meaning, and is used to prevent an unconscientious infringer from illegally using disclosed contents including a numerical value illustrated as being accurate or absolute in order to help understanding of the present invention.

In the entire specification of this application, terms, such as a "step ~(performing or doing)" or a "step of ~" does not mean a "step for ~".

Prior to a description of the elements of an image processing apparatus in accordance with an embodiment of the present invention, some elements described in this specification are first described below.

A term "multi-exposure" means that a single frame exposed once is exposed again several times so that several images are added to the single frame.

A term "motion blur" denotes the clear stripe of an object that is reflected in consecutive drawings or still images, such as images and animation, and that rapidly moves. If exposure is long or a motion is fast or when an image is changed while a single frame is captured, such a phenomenon appears.

Hereinafter, the present invention is described in detail with reference to the accompanying drawings and embodiments so that those skilled in the art to which this application pertains may repeatedly reproduce this application.

Figure 1:
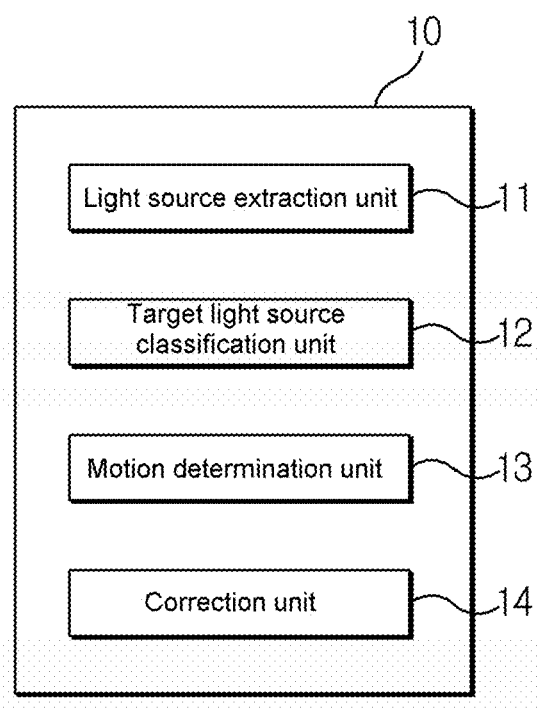
FIG. 1 illustrates a schematic block diagram of an image processing apparatus in accordance with an embodiment of the present invention.

FIG. 1 illustrates a schematic block diagram of an image processing apparatus in accordance with an embodiment of the present invention.

Referring to FIG. 1, the image processing apparatus 10 according to the present embodiment includes a light source extraction unit 11, a target light source classification unit 12, a motion determination unit 13, and a correction unit 14 in order to analyze a night image of a vehicle camera and analyze a pitch motion of a vehicle.

The vehicle camera includes a front camera installed at the front part of the vehicle.

Alternatively, the vehicle camera may include a camera configured to capture images in all directions of the vehicle, including the front of the vehicle. Furthermore, the vehicle camera may include a camera mounted on the vehicle and configured to photograph other parts in front of the vehicle in addition to the front of the vehicle.

The night image is an image captured by the vehicle camera, and denotes an image captured at night. The night image commonly includes an image in the vicinity (particularly, the front of the vehicle) of the vehicle that is being driven after dark. In general, the night image may be captured in a moving image form, and each night image may include a still image of about several frames to about several tens of frames per second.

The light source extraction unit 11 extracts light sources from a first frame of an image (the night image etc.) captured by the vehicle camera, and extracts light sources from a second frame of the image that is obtained at an interval of a first time from the first frame. The light source extraction unit 11 may extract light sources based on the pixel value (1 or 0) of each frame through common image processing (binarization etc.). More specifically, the light source extraction unit 11 extracts the light sources from the first frame that is exposed to the light sources during the first time, and extracts the light sources from the second frame that is exposed to the light sources during the second time. In this case, the first time and the second time may not be identical with each other. In general, a motion blur phenomenon is generated in an image of an object that fast moves and that is exposed to a light source for a long time, but a motion blur phenomenon is not generated in an image of an object that fast moves and that is exposed to the light source for a short time. The light source extraction unit 11 in accordance with an embodiment of the present invention extracts light sources from all frames, including a frame in which a motion blur phenomenon has occurred, using such phenomena.

The target light source classification unit 12 classifies a first target light source that belongs to the light sources of the first frame and that does not move. Furthermore, the target light source classification unit 12 classifies a second target light source that belongs to the light sources of the second frame and that does not move. In this case, the light source that does not move is installed in the vicinity of a road on which the vehicle is driven, and may include a streetlamp or a visual guidance reflector.

The streetlamp or the visual guidance reflector is installed so that it generates or reflects light in the vicinity of a road. The streetlamp or the visual guidance reflector is placed in a specific region of a frame of the night image captured by the vehicle camera and is photographed as having high brightness compared to other surrounding objects. Accordingly, the target light source classification unit 12 may classify light sources that are placed in predetermined regions (e.g., the upper left and right parts of the frames) and that have a specific pixel value 1 to be the first and the second target light sources in the processes of binarizing the first and the second frames.

The motion determination unit 13 estimates a first location, that is, the central point of the first target light source, estimates a second location where a motion blur has occurred, that is, the central point of the second target light source, and analyzes a pitch motion of the vehicle based on the first and the second locations. The motion determination unit 13 computes the center of gravity of the first target light source, including a plurality of pixels in the first frame, as the first location, and computes the location where the motion blur has occurred in the second target light source, including a plurality of pixels in the second frame, as the second location. In accordance with such a configuration, the motion determination unit 13 may designate a single pixel as the first location and one or more pixels as the second location with respect to a single target light source on each frame. The second location may include one or more pixels because the motion blur is generated in the second location.

Furthermore, the motion determination unit 13 overlaps the first frame and the second frame and compares the first location with the second location. Two objects appearing in the first and the second frames are overlapped because the same object has been photographed during different exposure times, but the centers of the two objects are not overlapped due to the motion blur phenomenon. The motion determination unit 13 computes the direction and degree of the pitch motion of the vehicle based on the principle that the centers of the two objects are not overlapped.

Furthermore, the motion determination unit 13 computes an estimation location where the first location is expected to be placed after being moved during the first time based on the vehicle speed and yaw rate of the vehicle. In accordance with such a configuration, the motion determination unit 13 may compute and estimate the estimation location of the first location, and may provide the compensation criterion of the second location in an image frame after the first time (i.e., the second frame).

The correction unit 14 corrects the image of the vehicle camera based on a result of the comparison between the first location and the second location. The correction unit 14 may correct the image of the vehicle camera based on a motion of the vehicle that has been determined by the motion determination unit 13.

In another embodiment, the image processing apparatus 10 according to the present embodiment may be implemented using means for performing the functions of the light source extraction unit 11, the target light source classification unit 12, the motion determination unit 13, and the correction unit 14 or an element configured to perform functions corresponding to the means. For example, the image processing apparatus 10 may be implemented using a logic circuit using flip-flops or a microprocessor. In such a case, the image processing apparatus 10 may be implemented in such a manner that a specific program in which the functions of the light source extraction unit 11, the target light source classification unit 12, the motion determination unit 13, and the correction unit 14 have been defined is stored in its own memory or a separate storage device and the logic circuit or the microprocessor executes the specific program stored in the memory or the storage device.

Figure 2:
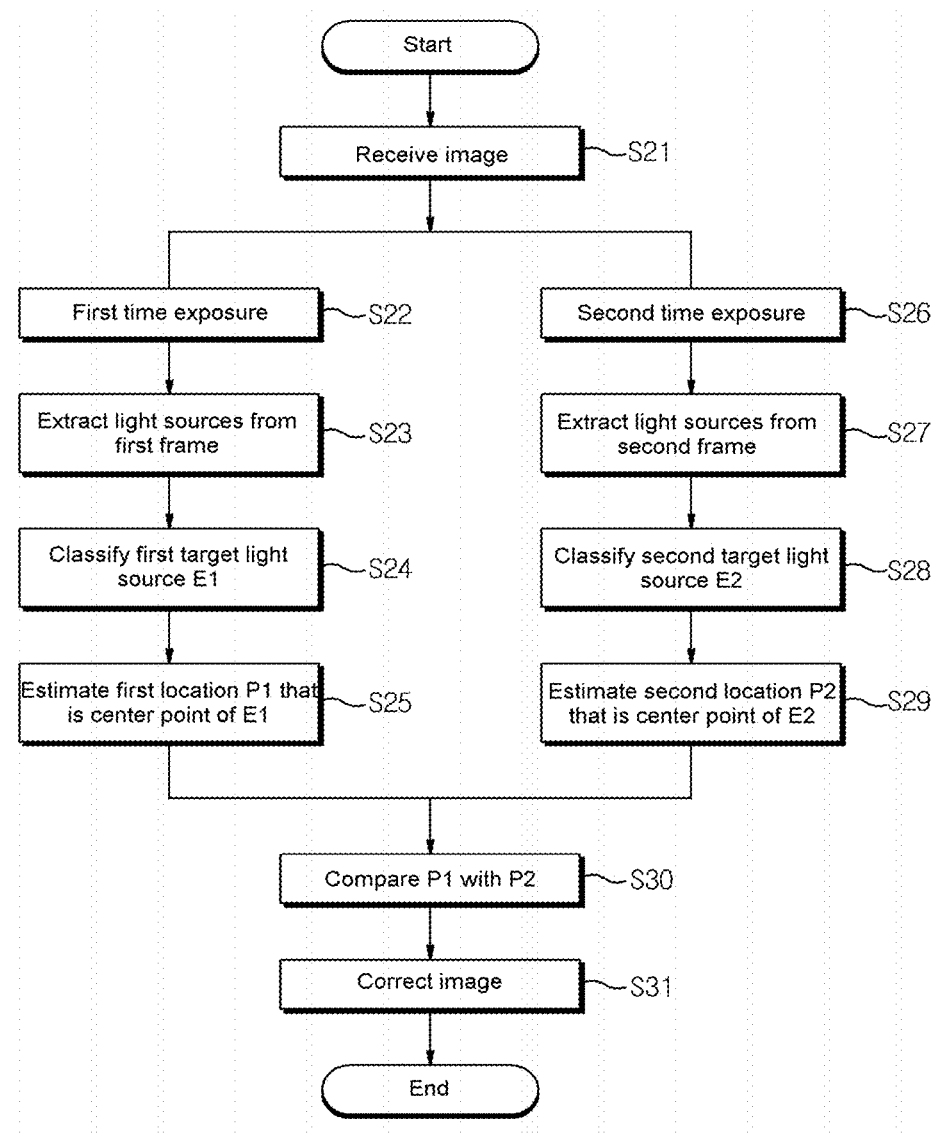
FIG. 2 is a flowchart illustrating an image processing method of a front camera in accordance with an embodiment of the present invention.

FIG. 2 is a flowchart illustrating an image processing method of the front camera in accordance with an embodiment of the present invention.

Referring to FIG. 2, in the image processing method of the front camera according to the present embodiment, first, when image (e.g., a night image) is received from the vehicle camera at step S21, the light source extraction unit 11 exposes the image during a first time at step S22. The light source extraction unit 11 extracts light sources from a first frame of the image obtained from the vehicle camera at step S23.

The target light source classification unit 12 classifies a first target light source E1 that belongs to the light sources extracted from the first frame and that does not move at step S24. At step S24 of classifying the first target light source E1, the target light source classification unit 12 may classify a light source present in a predetermined region of the first frame to be the first target light source by considering that a light source that does not move, such as a streetlamp or a visual reflection inductor installed in the vicinity of a road, is placed in a specific region of an image. In the present embodiment, the streetlamp may be a target light source for determining a pitch motion of the vehicle.

The motion determination unit 13 computes a first location P1, that is, the central point of the first target light source E1, at step S25. At step S25 of computing the first location P1, the motion determination unit 13 may perform binarization on an image of the first frame and extract the coordinates of the center of gravity of pixels having a specific value as the first location P1.

Thereafter, the light source extraction unit 11 exposes the image during a second time at an interval of a first time from the first frame at step S26. Furthermore, the light source extraction unit 11 extracts light sources from an obtained second frame at step S27. The second frame may be a frame that is included a plurality of frames included in the image received from the vehicle camera and that is placed right after the first frame. Assuming that the image received from the vehicle camera includes several frames to several tens of frames per second, the extraction of the light sources from the first frame and the extraction of the light sources from the second frame may be processed almost simultaneously or in parallel. This means that the method of correcting a night image of the vehicle camera according to the present embodiment may be usefully used in a vehicle that is being driven on a road at a speed of about 100 km/h (i.e., about 28 M per second) in real time.

The target light source classification unit 12 classifies a second target light source E2 that belongs to the light sources extracted from the second frame and that does not move at step S28. At step S28 of classifying the second target light source E2, the target light source classification unit 12 may classify a light source present in a predetermined region of the second frame to be the second target light source E2 by considering that a light source that does not move, such as a streetlamps or a visual reflection inductor installed in the vicinity of a road, is placed in a specific region of an image.

At step S24 of classifying the first target light source E1 or step S28 of classifying the second target light source E2, the target light source classification unit 12 may classify a plurality of streetlamps or visual guidance reflectors arranged along a road to be target light sources using a training method using a Support Vector Machine (SVM). The SVM is used to statistically binarize and classify predetermined data by producing a maximum-margin hyperplane in an input space, providing a training sample to which a value "Yes" or "No" is given, and dividing the training sample into "Yes" and "No" so that the distance from the closest sample to the hyperplane becomes a maximum. If the SVM is used, a target light source that belongs to the light sources of a night image and that does not move can be effectively classified.

The motion determination unit 13 computes a second location P2, that is, the central point of the second target light source E2, at step S29. At step S29 of computing the second location P2, the motion determination unit 13 may perform binarization on an image of the second frame and then extract the coordinates of the center of gravity of pixels having a specific value (e.g., 1 of 1 and 0) as the second location P2. In this case, the central point of the second target light source corresponds to a target light source that has generated a motion blur due to exposure for a long time, and thus the second location P2 may appear in the form of a single line not in the form of a single pixel, unlike the first location P1.

In this case, practically, the second target light source E2 is the same as the first target light source E1. However, since an exposure time due to the second target light source is different from that due to the first target light source, the first location, that is, the central point of the first target light source, and the second location, that is, the central point of the second target light source, have only to be overlapped, but are not identical with each other. A sheet of an image is obtained through auto-exposure and another sheet of an image is obtained through short exposure with respect to the same scene using a multi-exposure camera. In this case, a rolling shutter type CMOS sensor may be used as a digital sensor for obtaining the images. A rolling shutter is an electronic shutter used in a common CMOS type image sensor. In such a rolling shutter type sensor, a greater motion blur is generated as an object that fast moves is photographed due to the nature of the rolling shutter type sensor. Such a technology is well known to those skilled in the art, and thus a detailed description thereof is omitted.

Thereafter, the motion determination unit 13 compares the first location P1, that is, the central point of the first target light source, with the second location P2, that is, the central point of the second target light source, at step S30. The motion determination unit 13 determines whether or not a pitch motion has been generated in the vehicle and the direction of a generated pitch motion based on a result of the comparison.

The correction unit 14 corrects the image of the vehicle camera based on a result of the comparison between the first location P1 and the second location P2 at step S31.

At step S31 of correcting the night image of the vehicle camera, the correction unit 14 may extract an optimized correction direction and distance using a RANdom SAmple Consensus (RANSAC) algorithm, and may correct the night image using the extracted optimized correction direction and distance. The RANSAC algorithm is used to predict optimum parameters by repeatedly performing a process of randomly selecting some of predetermined original data. The RANSAC algorithm may be implemented in the form of a program or procedure for the image processing method installed on the image processing apparatus according to the present embodiment.

In some implementations, in order to correct the night image of the vehicle camera, the correction unit 14 may output a correction signal for correcting the current location of the tilting device of the vehicle camera based on a result of a comparison between an estimation location and the second location. The correction signal may be directly transmitted to the tilting device of the vehicle camera, or may be transmitted to a separate Electronic Control Unit (ECU) for controlling the tilting device. The tilting device of the vehicle camera or the ECU is well known in the art, and thus a detailed description thereof is omitted.

Figure 3:
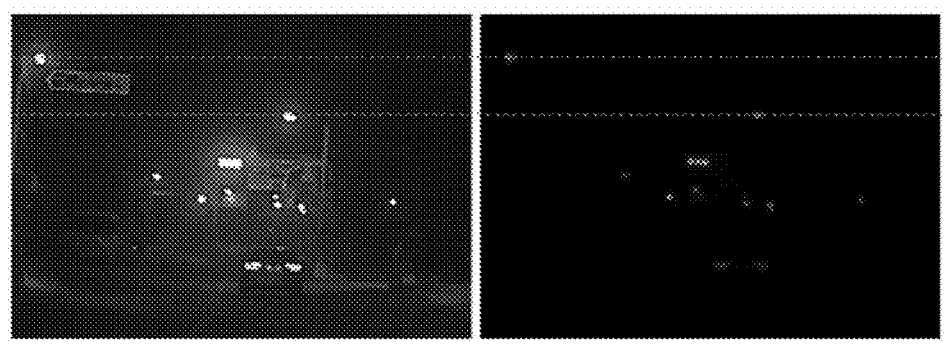
FIGS. 3 and 4 are conceptual diagrams illustrating the image processing method of the vehicle camera in accordance with an embodiment of the present invention.
Figure 4:
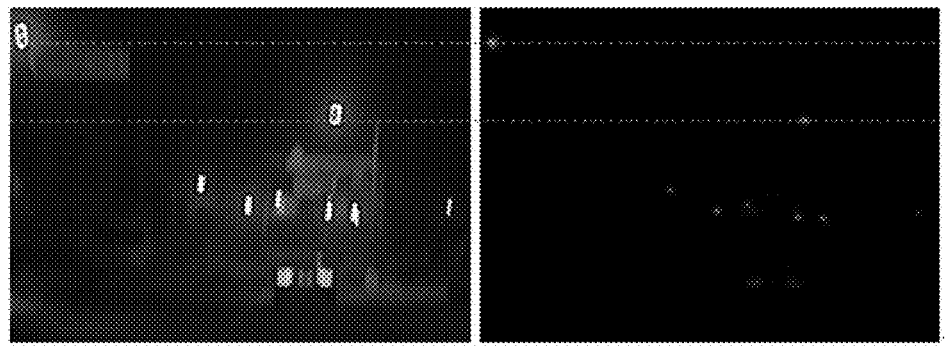

FIGS. 3 and 4 are conceptual diagrams illustrating the image processing method of the vehicle camera in accordance with an embodiment of the present invention.

As illustrated in FIG. 3, streetlamps are determined to be on the upper side of a received night image, and light sources are extracted. If a vehicle is driven on an even road surface as in FIG. 3, a pitch motion does not occur in the vehicle. Accordingly, light sources extracted from an image captured through auto-exposure for a long exposure time on the left of FIG. 3 and light sources extracted from an image captured through short exposure for a short exposure time on the right of FIG. 3 are placed almost at the same point or same height.

In contrast, as illustrated in FIG. 4, if a vehicle is driven on a road surface having irregularities, a pitch motion occurs in the vehicle. Accordingly, light sources extracted from an image captured through auto-exposure for a long exposure time on the left of FIG. 4 and light sources extracted from an image captured through short exposure for a short exposure time on the right of FIG. 3 are different in overlapped locations due to motion blurs.

A motion of the vehicle is checked using a motion blur according to the exposure time, and the night image is corrected.

A method of checking a motion of the vehicle and correcting the night image is described in more detail below.

Figure 5:
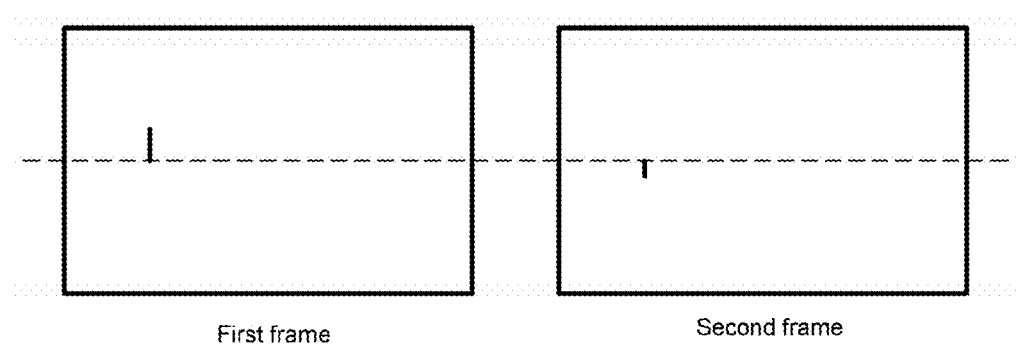
FIG. 5 is a conceptual diagram illustrating a method of checking a motion of a vehicle in accordance with an embodiment of the present invention.

FIG. 5 is a conceptual diagram illustrating a method of checking a motion of a vehicle in accordance with an embodiment of the present invention.

FIG. 5 illustrates a case where the vehicle is sequentially exposed to a light source during a first time and a second time while a rising motion feature is generated after the vehicle meets irregularities.

First, a light source is extracted from a first frame that has been exposed to the light source during the first time while the vehicle passes through the irregularities. A light source is extracted from a second frame that has been exposed to the light source during the second time right after the first time. In this case, the first time is relatively longer than the second time.

A motion blur is generated during the first time because the first time is longer than the second time. Furthermore, a motion blur is rarely generated during the second time because the second time is shorter than the first time. Accordingly, the direction of a pitch motion of the vehicle may be determined by analyzing the first frame and the second frame using information about the first time and information about the second time. More specifically, if the light sources within the first frame and the second frame appear to be overlapped on the lower side, it may be determined that the light source, for example, a streetlamp within a frame has been subject to a pitch motion from top to bottom, that is, the vehicle has been subject to a pitch motion from bottom to top.

Figure 6:
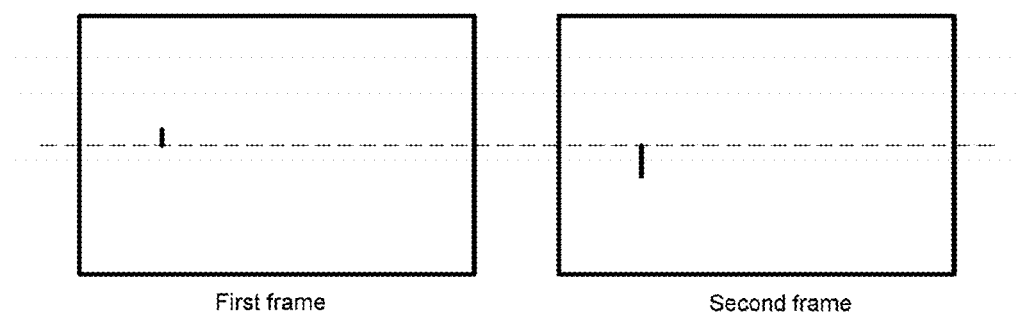
FIG. 6 is a conceptual diagram illustrating a method of checking a motion of a vehicle in accordance with another embodiment of the present invention.
Figure 7:
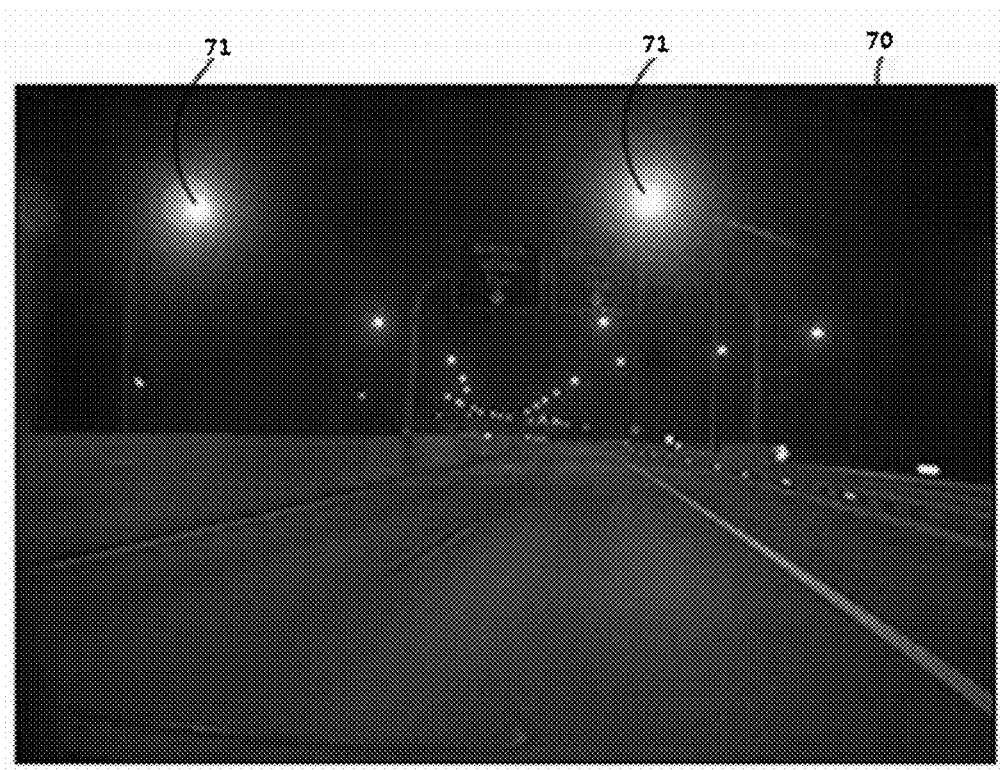
FIGS. 7 to 10 are exemplary diagrams illustrating the image processing method of a vehicle camera of FIG. 2.

FIG. 6 is a conceptual diagram illustrating a method of checking a motion of a vehicle in accordance with another embodiment of the present invention.

FIG. 6 illustrates a case where the vehicle is sequentially exposed to a light source during a first time and a second time while a rising motion feature is generated after the vehicle meets irregularities.

As in FIG. 5, a light source is extracted from a first frame that has been exposed to the light source during the first time while the vehicle passes through the irregularities. A light source is extracted from a second frame that has been exposed to the light source during the second time right after the first time. In this case, the second time is relatively longer than the first time.

A motion blur is generated during the second time because the second time is longer than the first time. Furthermore, a motion blur is rarely generated during the first time because the first time is shorter than the second time. Accordingly, how much has a pitch motion of the vehicle been generated in which direction may be determined by analyzing the first frame and the second frame using information about the first time and information about the second time. More specifically, if the light sources within the first frame and the second frame appear to be overlapped on the upper side, it may be determined that the light source, for example, a streetlamp within a frame has been subject to a pitch motion from top to bottom, that is, the vehicle has been subject to a pitch motion from bottom to top. Furthermore, if a motion blur appears long, it may be determined that a pitch motion of the vehicle has been greatly generated.

If a vehicle itself on which the vehicle camera is mounted moves, to correct a night image based on only a change in the location of a light source is problematic. In order to solve such a problem, a motion of the light source in the night image may be tracked by computing a motion of the vehicle using vehicle speed and a yaw rate that may be obtained from signals detected by a vehicle speed sensor and a yaw rate sensor. That is, compensation may be performed on a light source that does not move because the next location of the vehicle may be aware if the vehicle speed and the yaw rate are aware. A technology for predicting the next location of a vehicle using vehicle speed and a yaw rate is well known in the art, and thus a detailed description thereof is omitted.

The method of correcting the night image using a change in the location of the light source and a motion of the vehicle is described in more detail below.

FIGS. 7 to 10 are exemplary diagrams illustrating the image processing method of a vehicle camera of FIG. 2.

Figure 8:
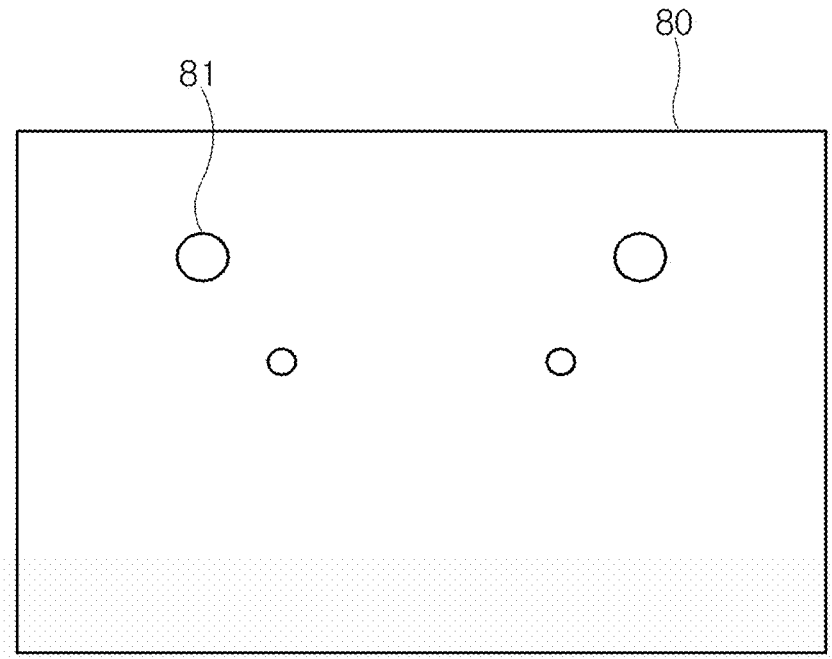

As illustrated in FIG. 8, image correction for stabilizing a night image may be applied based on a change in the locations of light sources extracted from a night image 80. That is, an error in the night image according to the shaking of the vehicle or the shaking of the vehicle camera may be compensated for based on a change in the locations of the light sources.

First, as illustrated in FIG. 8, light sources that move and light source that do not move, in the night image received from the vehicle camera, are separated. In FIG. 8, four light sources that do not move in a first frame of the night image 80 received from the vehicle camera are classified as first target light sources 81.

The light source that does not move may be a streetlamp, and the light source of an adjacent vehicle may be classified as a moving light source. Furthermore, reflectors (e.g., visual guidance reflectors arranged along a median strip or a guide rail at specific interval) may be classified as light sources that do not move because they are not moved.

In a method of recognizing a light source, the location of a streetlamp is relatively high, and such streetlamps are placed on the left and right. Light sources in a corresponding region may be classified as streetlamps. The reflectors may be classified using a specific recognition method like the streetlamps. For example, the light sources may be classified using a training method an SVM.

Figure 9:
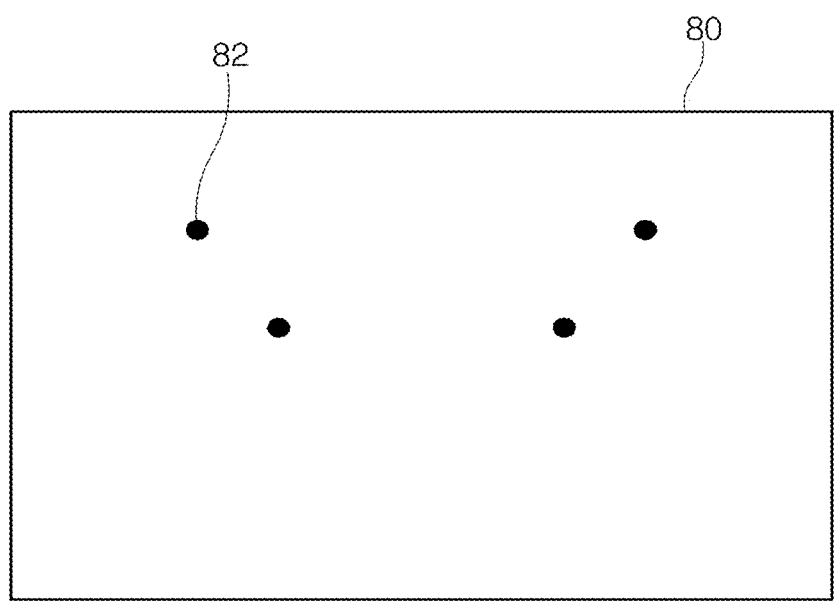

After the first target light sources 81 are retrieved, the central point of each of the first target light sources 81 is searched for. A first location 82, that is, the central point of each of the first target light sources 81, may be designated as a single pixel in the first frame. FIG. 9 illustrates the first locations 82 each having a specific size, that is, the central points of the first target light sources, for convenience sake.

In the present embodiment, instead of using a comparison between the central points of target light sources, the locations of the central points of the target light sources are used because the size of the target light source is different depending on the location. The computation of the central point of each target light source may correspond to a search for the center of gravity of the target light source or the center of a corresponding region through image binarization.

Figure 10:
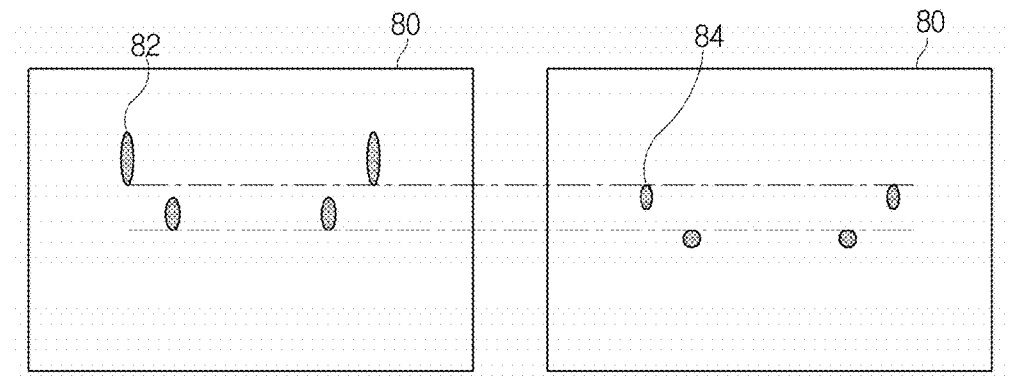

Thereafter, as illustrated in FIG. 10, the image processing apparatus 10 displays regions 82 in which the respective first target light sources 81 of a current frame (i.e., the first frame) are exposed during a first time.

Thereafter, as illustrated in FIG. 10, the image processing apparatus 10 extracts light sources from a next frame (i.e., a second frame), classifies second target light sources 83 that belong to the extracted light sources and that do not move, and display second regions 84 exposed during a second time shorter than the first time.

Thereafter, the image processing apparatus 10 compares the first locations 82 with the respective second locations 84 where the light sources are exposed in the night image or frame 80 in which the first frame and the second frame are overlapped, analyzes a pitch motion of the vehicle or the degree of shaking of the vehicle camera based on a result of the comparison, and performs stabilization on the night image based on a result of the analysis. The image processing apparatus 10 may compute the direction and degree of the vehicle that is vibrated up and down by performing a comparison on the vertical locations of the first locations 82 and the second locations 84 and on parts in which the first and the second target light sources are overlapped in the frame 80.

When computing an estimation location using vehicle speed and a yaw rate, the image processing apparatus 10 may differently compute an estimation location that has been moved from the first location on the left of the first frame and an estimation location that has been moved from the first location on the right of the first frame based on the yaw rate of the vehicle on the basis of a point of time of the dead center of the vehicle camera during a time obtained by dividing the number of frames by each unit time (e.g., 1 second) or an approximate dead center of the first frame corresponding to the point of time, and more specifically, may compute the degree of a pitch motion of the vehicle.

Figure 11:
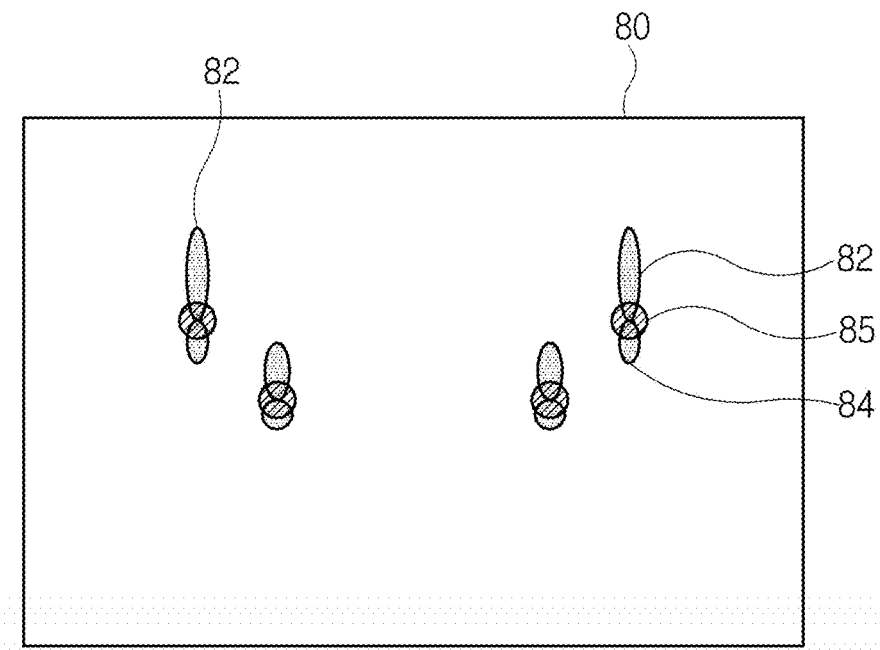
FIG. 11 is a diagram illustrating that the first frame and the second frame are overlapped in accordance with an embodiment of the present invention.

FIG. 11 is a diagram illustrating that the first frame and the second frame are overlapped in accordance with an embodiment of the present invention.

From FIG. 11, it may be seen that when the first frame and the second frame are overlapped, parts in which the first locations 82 and the second locations 84 are overlapped area generated on the lower side. The direction of a pitch motion of the vehicle may be determined by determining whether the parts in which the first locations and the second locations are overlapped as described above have been generated on the upper side or the lower side. Furthermore, the degree of the pitch motion may be determined with reference to the length of the first location.

It is necessary to correct the night image by taking into consideration a motion of the vehicle attributable to a time difference during the first time because a motion of the vehicle is analyzed using an image frame generated after a lapse of the first time. More specifically, an estimation location where the first location of the first target light source of a current frame (i.e., the first frame) will be placed in a next frame (i.e., the second frame) after a specific time (e.g., the first time) may be computed. The estimation location may be computed using the speed and yaw rate of the vehicle.

In accordance with the present embodiment, there can be provided the image processing method and image processing apparatus capable of effectively performing stabilization on a night image obtained by the vehicle camera. Furthermore, a vehicle driving assist system using the aforementioned image processing method or image processing apparatus is advantageous in that it can improve stability and reliability in the measurement of the distance from a preceding vehicle or the prevention of a forward vehicle collision.

Accordingly, the image processing method of a vehicle camera and an image processing apparatus using the same according to the embodiments of the present invention are advantageous in that they can prevent a reduction in the recognition of a traffic lane or the reliability of distance accuracy that is attributable to the vibration of a vehicle when a driving assist system mounted on the vehicle estimates the distance from a preceding vehicle based on a night image captured by a vehicle camera mounted on the front part of the vehicle.

As described above, although the specific embodiments of the present invention have been illustrated, the present invention is not limited to the embodiments, and those skilled in the art to which the present invention pertains may change, substitute, and modify the present invention in various ways without departing from the scope and spirit of the present invention. Such changes, substitutions, and modifications should be construed as belonging to the accompanying claims of the present invention.

What is claimed is:

1. An image processing apparatus of a vehicle camera, comprising:
  a light source extraction unit configured to extract light sources from a first frame exposed to light sources during a first time and to extract light sources generating motion blurs from a second frame exposed to the light sources during a second time longer than the first time;
  a target light source classification unit configured to classify a first target light source that belongs to the light sources of the first frame and that does not move and a second target light source that belongs to the light sources of the second frame and that does not move;
  a motion determination unit configured to estimate a first location that is a central point of the first target light source and a second location that is a central line comprising a central point of the second target light source, compare the first location with the second location, determine whether or not a pitch motion of the vehicle has occurred, perform binarization on an image of the first frame or the second frame, and extract coordinates of the center of gravity of pixels having a specific value as the first location or the second location; and
  a correction unit configured to correct an image of the vehicle camera based on a result of the comparison between the first location and the second location.

2. The image processing apparatus according to claim 1, wherein the light source that does not move comprises at least one of a streetlamp and a visual guidance reflector.

3. The image processing apparatus according to claim 1, wherein the motion determination unit is further configured to overlap the first frame and the second frame and to determine a direction or degree of the pitch motion of the vehicle based on a location where the first location and the second location are overlapped.

4. The image processing apparatus according to claim 1, wherein a digital sensor of the image processing apparatus is a rolling shutter type CMOS sensor.

5. An image processing method of a vehicle camera, comprising:
  extracting light sources from a first frame that has been obtained by the vehicle camera and that has been exposed to light sources during a first time;
  classifying a first target light source that belongs to the extracted light sources and that does not move;
  computing a first location that is a central point of the first target light source;
  extracting light sources generating motion blurs from a second frame that has been obtained by the vehicle camera and that has been exposed to light sources during a second time longer than the first time;

classifying a second target light source that belongs to the light sources extracted from the second frame and that does not move;

computing a second location that is a central line comprising a central point of the second target light source;

comparing the first location with the second location; and determining whether or not a pitch motion of the vehicle has occurred based on a result of the comparison between the first location and the second location, wherein the computing the first location or the computing the second location comprises:

performing binarization on an image of the first frame or the second frame, and extracting coordinates of the center of gravity of pixels having a specific value as the first location or the second location.

6. The image processing method according to claim 5, further comprising correcting an image of the vehicle camera based on the result of the comparison between the first location and the second location.

7. The image processing method according to claim 5, wherein classifying the first target light source or classifying the second target light source comprises classifying a light source present in a predetermined region of the first frame or the second frame as a target light source.

8. The image processing method according to claim 5, wherein classifying the first target light source or classifying the second target light source comprises classifying a plurality of streetlamps or visual guidance reflectors arranged along a road as target light sources in accordance with a training method using a support vector machine.

9. The image processing method according to claim 5, wherein determining whether or not a pitch motion of the vehicle has occurred based on a result of the comparison between the first location and the second location comprises:

overlapping the first frame and the second frame, and determining a direction or degree of the pitch motion of the vehicle based on a position where the first location and the second location are overlapped.

10. The image processing method according to claim 5, wherein the second frame is a frame that belongs to a plurality of frames included in the image and that is placed right after the first frame.

11. The image processing method according to claim 6, wherein correcting an image of the vehicle camera comprises:

extracting an optimized correction direction and distance using a RANdom SAmple Consensus (RANSAC) algorithm, and correcting the image.

\* \* \* \* \*